United States Patent Office 2,718,939
Patented Sept. 27, 1955

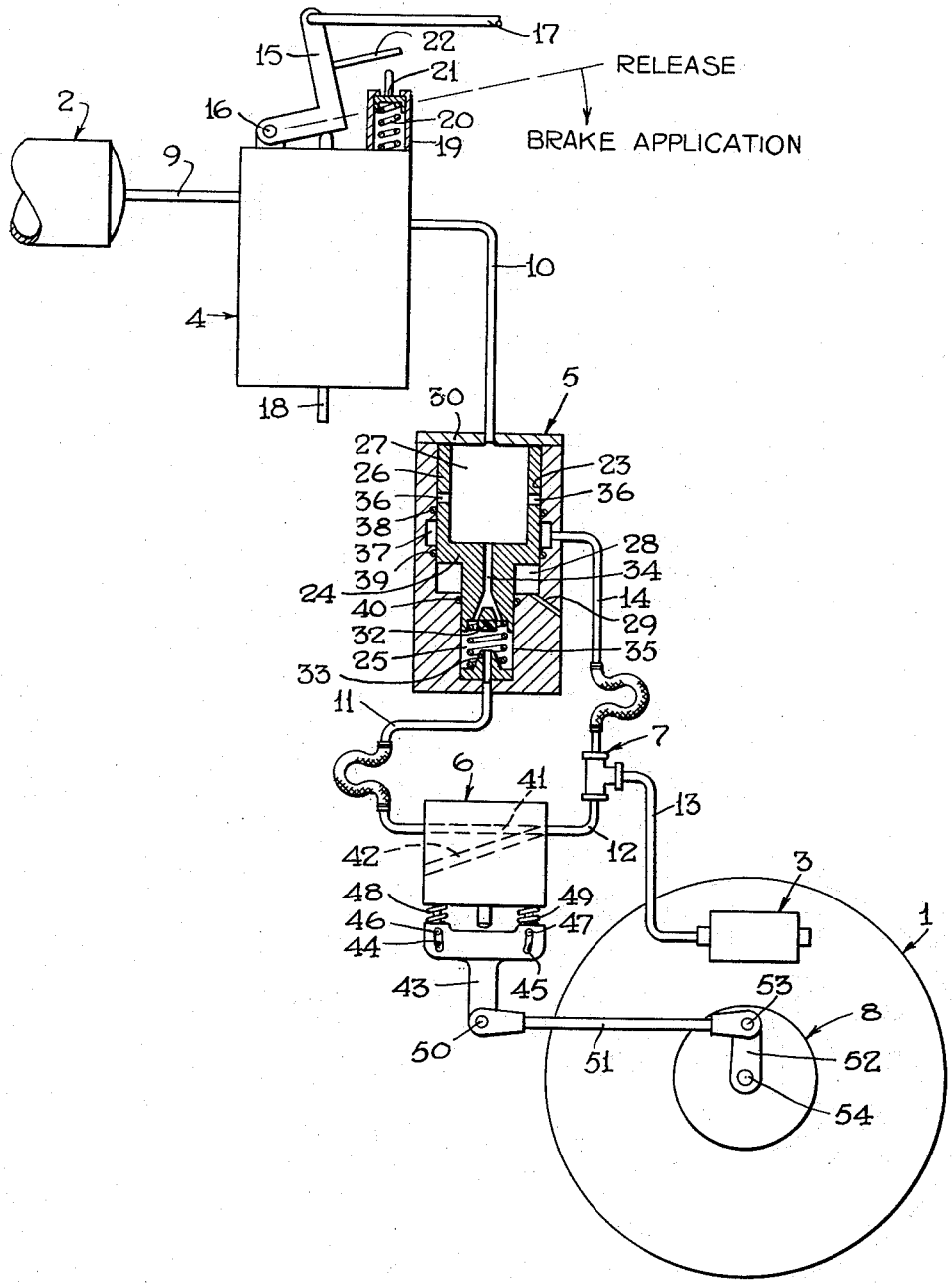

2,718,939

AUTOMATICALLY CONTROLLED BRAKE APPARATUS WITH EMERGENCY APPLICATION MEANS

Arthur J. Bent and Walter R. Forster, Pittsburgh, Pa., assignors to Westinghouse Air Brake Company, Wilmerding, Pa., a corporation of Pennsylvania Application November 17, 1953, Serial No. 392,534

9 Claims. (Cl. 188—181)

This invention relates to vehicle brake apparatus of the fluid pressure operable type having a wheel-slip control device for automatically preventing locking and sliding of a vehicle wheel and including emergency application means.

In fluid pressure operable brake control apparatus for certain vehicles, anti-wheel-slide control devices have been provided which are responsive to the slipping of a wheel for automatically releasing the brakes on the wheel during the time that the wheel is slipping and for automatically effecting a reapplication of the brakes to the wheel upon termination of the wheel-slipping, such brake release and reapplication occurring in repeated cycles as necessary during the stopping of the vehicle, to thereby prevent locking of the wheels. As herein used, the term "slipping condition" refers to the condition existing during the short interval, of the order of one or two seconds, in which the wheel decelerates at an excessively rapid rate toward a locked condition as a result of application of a braking force exceeding the permissible limit of adhesion of the wheel tread to the ground or road surface. As distinguished from the term slipping condition, the term "sliding condition," as used herein, refers to the dragging of a wheel in a locked condition on the runway or ground.

Anti-wheel-slide devices, of the type referred to herein, are designed to operate automatically, in response to a slipping condition of the wheel after a brake application has been effected, to effect a brake release, thereby permitting the wheel to rotate freely until the wheel has accelerated back to ground speed, after which the anti-wheel-slide device will operate automatically to effect a reapplication of the braking forces to the wheel. Such cycles of operation of the anti-wheel-slide device will occur as many times and as frequently as the wheel might slip during the stopping distance of the vehicle and the greater the number and frequency of such automatic brake releases and reapplications, the longer will be the stopping distance. It is conceivably possible, especially when unfavorable roadway or runway conditions exist, such as a wet, icy or uneven surface, that the vehicle, as a result of an abnormal number of automatic brake releases and reapplications, cannot be brought to a stop within the available length of the runway.

Under such circumstances, it would be desirable to have some means whereby the operator of the vehicle could effect a cutout of the automatic devices controlling the brakes and revert to manual control of the brakes.

Accordingly, the principal object of the invention is to provide a brake control apparatus of the type described having means for cutting out the wheel-slip responsive control device and thereby permitting the pilot to manually control the vehicle brakes.

It is conceded that sliding of the wheels and damage to the tires of a vehicle may result from use of the invention, but the sliding wheels will still offer a certain amount of retardation to the forward motion of the vehicle. It is intended, therefore, that the invention be used as an emergency measure only at such times when it would appear that the automatic control devices would not allow the vehicle to be brought to a stop within the allotted stopping distance.

Other objects and advantages of the invention will appear in the following more detailed description thereof when read in conjunction with the accompanying drawing, wherein:

The single figure is a diagrammatic view, partly in section and partly in outline, of a brake control apparatus embodying the invention.

Description

For purposes of illustration, the invention will hereinafter be described as it applies to airplanes, but it should be understood that it is not intended to be so limited, for the invention is equally applicable to other wheel vehicles employing fluid pressure operable brake control apparatus of the type above described.

As shown in the drawing, the reference numeral 1 designates a vehicle wheel adapted to be braked. The fluid pressure operable brake control apparatus for applying braking force to and releasing such force from the wheel 1 comprises a fluid pressure supply reservoir 2, which is adapted to be charged with fluid under pressure by a compressor (not shown) or to be ground charged before the vehicle leaves for a trip, a brake application device 3, a manually operable brake control valve device 4, a by-pass, or cut-out device 5, a release valve device 6, a double check valve device 7, and a wheel-slip responsive control device 8.

The brake application device 3, shown in outline in the drawing, may be, and for purposes of illustrating the invention is, the usual type brake cylinder adapted in a conventional manner for actuating brake shoes or brake elements (not shown) to exert a braking effect on the wheel 1. While not deemed essential to an understanding of the invention and, therefore, not shown in the drawing, the brake application device 3 includes a piston which, when subjected to pressure of fluid on one side, is actuated to effect a brake application on the wheel 1, and, when relieved of such pressure, will be returned to a normal position by a spring, in which normal position a brake release is effected. The brake application device 3 is adapted to be supplied with fluid under pressure from the reservoir 2 by way of conduit means comprising pipes 9, 10, 11, 12 and 13 when the by-pass device 5 is in a normal position or by way of conduit means comprising pipes 9, 10, 14 and 13 when said by-pass device is in a by-pass position, which normal and which by-pass positions will be hereinafter described.

The brake control valve device 4, which is shown in outline in the drawing and which is connected to the reservoir 2 by way of pipe 9, is a manually operable, self-lapping type adapted to accurately maintain a selected degree of fluid pressure supplied to pipe 10 from said reservoir. A bell-crank operating lever 15 is pivotally mounted at one end thereof to the casing of the brake valve device 4 by means of a pin 16, while the other end of said lever is adapted to be connected by suitable linkage, of which a portion 17 is shown, to either a foot pedal or hand lever, neither of which is shown, mounted in the operator's or pilot's cabin for actuating said operating lever.

The operating lever 15 is pivotally operable about the pin 16 in a clockwise direction, as viewed in the drawing, out of a normal "Release" position, in which it is shown in the drawing and in which pipe 10 is vented to atmosphere by way of an exhaust port 18 in the brake valve device 4, into a "Brake application" zone to effect supply of fluid at a pressure proportional to the degree of movement out of "Release" position, in the direction indicated in the drawing by the arrow, to the by-pass device 5 by opening communication between pipes 9 and 10.

The brake valve device 4 is also provided with a stop device 19 adapted to offer yieldable resistance to further movement of the operating lever 15 after said lever has been moved, as above described, into the "Brake application" zone up to a certain point, or what may be called a service position, in which the degree of the pressure of fluid supply thus effected to the by-pass device 5, and eventually to the brake application device 3, is sufficient for effecting a normal brake application on the wheel 1. The stop device 19 comprises a casing enclosing a spring 20 acting on a spring follower 21 which extends to the exterior of said casing and which is adapted to be engaged by a plate 22 fixedly attached to the operating lever 15 when said lever reaches its service position whereby further movement of said lever beyond said service position will be yieldingly resisted by said spring and the pilot of the airplane will be thus apprised by sense of "feel," through the linkage connecting said lever with the foot pedal or hand lever, that said lever has been moved to or beyond its service position. The purpose for apprising the pilot of this condition will be described hereinafter.

The by-pass device 5, according to the invention, is interposed between the brake valve device 4 and the release valve device 6, said by-pass device being connected to said brake valve device by the pipe 10 and to said release valve device by the pipe 11. The by-pass device 5 is also connected to the brake application device 3 by way of pipes 14 and 13, with the check valve device 7 interposed between said pipes.

For purposes of illustration, the by-pass device 5 may comprise a casing with a bore 23 one portion of which is of smaller diameter than the other. A piston 24, also having one portion of smaller diameter than the other, is slidably mounted in the bore 23 with said smaller portion cooperating with the smaller portion of said bore to define a pressure chamber 25 open to pipe 11. The larger portion of the piston 24 has formed integrally therewith a cup-like follower 26 which cooperates with the bore 23 to define a pressure chamber 27 open to pipe 10, while at the opposite side of said follower, intermediate the chambers 25 and 27, there is an atmospheric chamber 28 open to atmosphere by a vent 29 in the casing, it being noted that the area of said piston adjacent chamber 27 is greater than the pressure area adjacent chamber 25.

The piston 24 has a normal position, defined by engagement of the follower 26 with an end wall 30 of the casing adjacent chamber 27, in which normal position said piston is shown in the drawing and in which communication between pipes 10 and 11 is open and between pipes 10 and 14 is closed. The smaller pressure side of piston 24, adjacent chamber 25, carries a valve 32 which is adapted for making sealing engagement with a seat rib 33 surrounding the opening of pipe 11 to said chamber when said piston is moved to a by-pass position in which communication between pipes 10 and 11 is closed and between pipes 10 and 14 is open. A choked passageway 34 open to both pressure sides of the piston 24 provides communication between chambers 25 and 27, and thereby between pipes 10 and 11, when said piston is in its normal position. A spring 35, disposed in chamber 25, acts on the piston 24 for urging said piston toward its normal position with a force which, combined with the pressure of fluid in said chamber also acting on said piston, is sufficient to maintain said piston in said normal position against the opposing force of fluid pressure in chamber 27 acting on the opposite side of said piston, provided said opposing pressure does not exceed a service pressure or the degree of fluid pressure as effected by operation of the operating lever 15 of the brake valve device 4 to its service position.

The follower 26 of the piston 24 has a plurality of circumferentially arranged openings 36 so situated on said follower as to register with an annular groove 37 in the casing when said piston is in its by-pass position, said groove being open to pipe 14, to thereby open communication between pipes 10 and 14 through chamber 27, said openings 36 and said groove.

Sealing O-rings 38 and 39 having sealing and sliding contact with the larger portion of the piston 24 are disposed in the casing at either side of the groove 37 to prevent leakage of fluid under pressure from chamber 27 past said piston to said groove when said piston is in its normal position and to prevent leakage of fluid under pressure from said chamber past said piston to atmospheric chamber 28 when said piston is in its by-pass position. A sealing O-ring 40 having sealing and sliding contact with the smaller portion of piston 24 is disposed in the casing to prevent leakage of fluid under pressure from chamber 25 past said piston to atmospheric chamber 28.

The release valve device 6, which is shown in outline in the drawing, is interposed between pipes 11 and 12 for controlling communication therebetween and between pipe 12 and atmosphere, and may be, for example, of the type described in detail in U. S. Patent No. 2,573,387 issued to Rankin J. Bush on October 30, 1951.

Briefly, the device 6 comprises valve means (not shown) having a normal position in which pipes 11 and 12 are connected by way of a communication 41 indicated, schematically, by broken lines and a fluid pressure release position in which pipes 11 and 12 are disconnected, and pipe 12, and thereby pipe 13, through the check valve device 7, and the brake application device 3 are open to atmosphere by way of a communication 42 indicated, schematically, by broken lines. Since reference may be had to the above mentioned patent issued to Rankin J. Bush, it is deemed sufficient, for an understanding of the invention, to point out that the release valve device 6 has a T-shaped operating lever 43 with two oppositely extending arms having near their respective ends slots 44 and 45 through which pins 46 and 47, secured to the casing, extend, respectively. The operating lever 43 is pivotable out of a central, normal position about each of the pins 46 or 47 to effect operation of the release valve device 6 to close communication 41 and establish communication 42. Two like springs 48 and 49, under pressure, are interposed between the casing of the device 6 and the opposite ends of the two extending arms, respectively, of lever 43 to bias said lever to its central, normal position in which communication 41 is established and communication 42 is closed. A portion of operating lever 43 depends from the junction of the two oppositely extending arms and is pivotally connected by means of a pin 50 to one end of a link rod 51, the other end of said link rod being pivotally connected to one end of a rocker arm 52 by means of a pin 53. The other end of the rocker arm 52 is rigidly attached to an operating shaft 54 of the control device 8.

The control device 8, which is shown in outline in the drawing, may be of any suitable type, but preferably of the rotary type disclosed in the aforementioned patent issued to Rankin J. Bush, including a housing adapted to be coaxially and removably mounted on the wheel 1 for rotation therewith. While not shown in the drawing and not deemed essential to an understanding of the invention, the housing of the control device 8 contains an inertia mass rotatable therein and connected through clutch means and a cluster of planetary gears to the operating shaft 54, so that, when rotation of said inertia mass is in synchronization with the rotation of the wheel 1 or what may be called a normal rotating position occupied when said wheel is not slipping on the running surface, no rotational force is produced on said operating shaft, but when, as applied to an airplane, said wheel is accelerating to ground speed immediately following touchdown or when said wheel is decelerating in response to slip on the running surface, said inertia mass will either lag behind or overrun, respectively, said wheel to thereby cause a rotational force to be exerted on said shaft which in turn operates the release valve device 6 to establish release communication 42.

The check valve device 7, interposed at the juncture of pipes 12, 13 and 14, controls communication between pipes 12 and 13 or between pipes 14 and 13. Fluid pressure in pipe 12 will normally maintain a valve (not shown) contained in the check valve device 7 in a normal position in which communication between pipes 12 and 13 is open and between pipes 14 and 13 is closed. Upon admission of fluid pressure in pipe 14 greater than the fluid pressure in pipe 12, the valve in the check valve device 7 will be moved to close communication between pipes 12 and 13 and to open communication between pipes 14 and 13.

For purposes of simplicity only one landing wheel of an airplane is shown, but it should be understood that each of the wheels desired to be braked should be similarly equipped with a release valve device 6, a check valve device 7 and a control device 8 connected in parallel from the pipes 11 and 14 with the release valve device 6 and the check valve device 7 shown in the drawing.

Operation

In operation, let it be assumed that reservoir 2 is charged with fluid under pressure, that the several devices comprising the brake apparatus are in their respective normal positions, and that the landing wheels of the airplane, in landing, have just made contact with the surface of the runway. The pilot of the airplane, upon touchdown of the landing wheels on the runway surface or shortly thereafter, will effect operation of the lever 15 of the brake valve device 4 in a clockwise direction, as viewed in the drawing, by operating the brake pedal or hand lever in the cabin, thereby causing fluid at a pressure, as determined by the extent to which the lever 15 is operated out of its "Release" position, to be admitted into pipe 10 and thereby into chamber 27 of the by-pass device 5 from the reservoir 2.

Assuming that the pilot effects operation of the lever 15 to its service position, he being apprised when said lever is in said position by sense of "feel" when the plate 22 contacts the follower 21 of the stop device 19, as above described, the fluid pressure thus provided in chamber 27 of the by-pass device 5, because of the choked passageway 34, will momentarily overcome the opposing force of spring 35 in chamber 25 causing the piston 24 to move toward its by-pass position and possibly permitting fluid pressure to reach pipe 14 by way of the openings 34 and the groove 37 if said piston is moved sufficiently to cause said openings to register with said groove. Fluid pressure in pipe 14 will operate the check valve device 7 to close communication between pipes 12 and 13 and to open communication between pipes 14 and 13, thereby supplying fluid pressure to the brake application device 3. This condition, however, may exist at the most only for the length of time that it takes the fluid pressure in chamber 25 of the by-pass device 5 to equalize with the fluid pressure in chamber 27 by way of the passageway 34, after which time the spring 35 will actuate the piston 24 to its normal position and maintain said piston in said normal position provided the operating lever 15 of the brake valve device 4 is not operated beyond its service position. After the piston 24 has been returned to its normal position, further supply of fluid pressure to pipe 14 will be cut off, and fluid pressure will then be supplied to pipe 11 by way of passageway 34 and chamber 25 and may momentarily be supplied to pipe 12 by way of the communication 41 in the release valve device 6 to thereby effect operation of the check valve device 7 to its normal position in which, as above noted, pipe 13 will be closed to pipe 14 and open to pipe 12.

Immediately upon touchdown of wheel 1, however, said wheel will start to accelerate and overrun the inertia mass contained in the control device 8 and thereby effect an angular movement of the operating shaft 54 the rocker arm 52 out of normal position in a clockwise direction, for example, as viewed in the drawing. This movement of arm 52, acting through link 51, will rock lever 43 of the release valve device 6 about the pin 46 in a counterclockwise direction, as viewed in the drawing, against the opposing force of spring 49. This rocking of lever 43 will effect operation of the release valve device 6 to render communication 41 ineffective and communication 42 effective, thereby releasing any fluid pressure in the brake application device 3 to atmosphere by way of pipes 13 and 12 and communication 42.

The control device 8 will respond to initial acceleration of the wheel 1 to open the brake application device 3 to atmosphere, as just described, almost instantaneously at the start of said acceleration of said wheel upon touchdown and thereby rapidly release a brake application if prematurely initiated by the pilot.

When, after touchdown, the wheel 1 has become accelerated to substantially ground speed, the inertia mass in the control device 8 will become synchronized therewith and spring 49 then acts to return lever 43 to its normal position thereby permitting the release valve device to operate to disestablish communication 42 and reestablish communication 41. With communication 41 reestablished, fluid at desired braking pressure, determined by the position of lever 15 of the brake valve device 4, will be transmitted through pipes 12 and 13 to the brake application device 3 to effect braking of wheel 1.

Let it be assumed now that, due perhaps to an excessive degree of application of the brakes to wheel 1, or due to said wheel running into an uneven or slippery condition on the runway where the traction is insufficient to keep said wheel rolling against the retarding action of the brake application on said wheel, the wheel 1 begins to slip. In these circumstances, the wheel 1 decelerates relative to the rotary inertia mass in the control device 8 thus causing a rotational force to be exerted on the shaft 54 and the rocker arm 52 so that said rocker arm is rocked in a counterclockwise direction and turns lever 43 from normal position about the pin 47 in a clockwise direction, as viewed in the drawing, against the opposing force of spring 48. The release valve device 6 will thus be operated to effect disestablishment of communication 41 and establishment of communication 42, whereby fluid pressure in the brake application device 3 will be released, as heretofore described, to effect release of the brakes on said wheel.

Upon release of the brakes on the wheel 1 in response to a slipping thereof, as above described, said wheel will accelerate back to ground speed of the airplane, whereupon the control device 8 will effect operation of the release valve device 6 to disestablish communication 42 and reestablish communication 41 to allow fluid under pressure to be transmitted through pipes 12 and 13 to the brake application device 3 to reapply the brakes on said wheel. If the wheel 1 again starts to slip before the airplane comes to a stop, the brakes thereon will again be automatically released, and, upon cessation of wheel-slip, the brakes will be reapplied in the same manner as above described. As previously noted, the control device 8 and the release valve device 6 will operate to release and reapply the brakes on the wheel 1 in repeated cycles corresponding to the number of times that said wheel may slip until eventually the airplane comes to a stop.

Let it be assumed, however, that due to the repeated cycles of release and reapplication of the brakes on the wheel 1, it becomes evident to the pilot of the airplane that continued automatic control of the brakes on said wheel by the control device 8 and the release valve device 6 may result in failure to bring the airplane to a stop within the allotted stopping distance as provided by the runway. Upon realization of such a situation, the pilot may then effect further operation of the lever 15 of the brake valve device 4 beyond the service position of said lever in a clockwise direction, as viewed in the drawing. Operation of the lever beyond its service position, as previously noted, will be yieldingly opposed by the stop device 19, so that the pilot will be apprised through the sense of "feel" that said lever has been moved beyond said service position.

Movement of the lever 15 beyond its service position will effect supply of fluid at a higher degree of pressure than service pressure to pipe 10 and consequently to chamber 27 of the by-pass device 5. This greater degree of pressure acting on piston 24 in chamber 27 will be sufficient to overcome the opposing force of the spring 35 and fluid pressure in chamber 25, and, because of the choked passageway 34 restricting flow of fluid at said greater pressure from chamber 27 to chamber 25, will promptly move said piston to its by-pass position whereby chamber 27 will be opened to pipe 14 and closed to pipe 11, as above described.

With fluid pressure cut off from pipe 11 and consequently pipe 12, the fluid pressure in pipe 14 will actuate the check valve device 7 to close communication between pipes 12 and 13 and to open communication between pipes 14 and 13, thereby effecting supply of fluid pressure to the brake application device 3 and rendering the release valve device 6 and the control device 8 ineffective for controlling said brake application device.

Thus, as long as the pilot maintains the operating lever 15 of the brake valve device 4 within the "Brake application" zone beyond the service position, he can manually control the brakes of the airplane to effect a greater degree of braking force on the wheels and thereby bring the airplane to a stop within the stopping distance afforded by the runway.

Should the pilot desire to revert to automatic control of the brake apparatus, he need merely relax the pressure on the foot pedal or hand lever to permit the lever 15 of the brake valve device 4 to return to its service position whereby the pressure of fluid in pipe 10 and consequently in chamber 27 of the by-pass device 5 will be reduced accordingly. The spring 35 in chamber 25 will bias the piston 24 to its normal position to disestablish communication between pipes 10 and 14 and reestablish communication between pipes 10 and 11, as above described. With fluid pressure in pipe 14 cut off and with fluid pressure in pipe 12 re-established by way of pipe 11 and communication 41, the check valve device 7 will be actuated to close communication between pipes 14 and 13 and reestablish communication between pipes 12 and 13, and the brake application device 3 will again be controlled by the control device 8 and the release valve device 6.

*Summary*

It should now be seen that the invention provides for a brake apparatus of the type employing a wheel-slip responsive device for automatically releasing the brakes on a wheel during wheel-slip and for reapplying the brakes upon termination of the wheel-slip, means for by-passing the wheel-slip device and permitting manual control of the brakes when it appears that the wheel-slip device will not permit stopping of the airplane within the allotted stopping distance.

Having now described the invention, what we claim as new and desire to secure by Letters Patent, is:

1. In a brake control apparatus for a vehicle wheel, in combination, control means automatically operable for effecting a brake release and a brake application in cyclic frequency corresponding to the frequency of occurrence of a wheel-slip and termination of said wheel-slip, respectively, brake application means connected to and controlled by said control means and operable in response to fluid pressure and to relief of such pressure for effecting said brake application and said brake release, respectively, manually operable valve means connected indirectly to said brake application means through said control means for effecting supply of fluid under pressure to said brake application means, and means for disconnecting said brake application means from said control means and connecting same directly to said manually operable valve means whereby operation of said brake application means may be controlled solely by said manually operable valve means.

2. In a brake control apparatus for a vehicle wheel, in combination, brake application means responsive to fluid pressure for effecting a brake application on said wheel and to relief of such pressure for effecting a brake release, a source of fluid under pressure for said brake application means, control means responsive to a slipping condition of said wheel for automatically relieving said brake application means of fluid pressure and responsive to termination of said slipping condition for automatically effecting supply of fluid under pressure to said brake application means, manually operable valve means for effecting supply of fluid under pressure from said source to said control means, and means for by-passing said control means and opening a direct communication between said manually operable valve means and said brake application means whereby supply and release of fluid under pressure to and from, respectively, said brake application means may be manually controlled solely by said manually operable valve means.

3. In a brake control apparatus having means responsive to a slipping of a vehicle wheel for automatically effecting a brake release on said wheel and responsive to cessation of said slipping for automatically effecting a brake application on said wheel, in combination, a brake application device controlled by said means and responsive to fluid pressure to effect said brake application and to relief of such pressure for effecting said brake release, a source of fluid under pressure for said brake application device, manually operable valve means for controlling the pressure of fluid supplied to said brake application device, yieldable means whereby the vehicle operator is apprised by sense of "feel" after said manually operable valve means has been operated beyond a certain point at which supply of fluid at a certain degree of pressure is effected, and means operably responsive to pressure of fluid above said certain degree for effecting a by-pass of said first mentioned means and connecting said brake application device to said manually operable valve means whereby application and release of the brakes may be manually controlled.

4. A brake control apparatus for a vehicle wheel comprising, in combination, a brake application device responsive to fluid pressure for effecting a brake application on said wheel and to relief of such pressure for effecting a brake release, a source of fluid under pressure for said brake application device, a first conduit means providing for flow of fluid under pressure from said source to said brake application device, manually operable valve means for controlling the pressure of fluid supplied from said source to said brake application device, a release valve device operable to one position for closing communication through said first conduit means and relieving said brake application device of fluid pressure and operable to another position for opening said communication, a control device responsive to a slipping condition of said wheel for operating said release valve device to its said one position and responsive to termination of said slipping condition to effect operation of said release valve device to its said other position, an alternate conduit means providing for flow of fluid under pressure from said source to said brake application device by by-passing said release valve device and said control device, and a by-pass device connected to said first and said alternate conduit means and responsive to fluid at a pressure above a certain degree to close communication through said first conduit means and open communication through said alternate conduit means.

5. In a brake control apparatus for a vehicle wheel, in combination, a brake application device responsive to fluid pressure for effecting a brake application on said wheel and to relief of such pressure for effecting a brake release, a source of fluid under pressure for said brake application device, a first conduit means providing for flow of fluid under pressure from said source to said brake application device, valve means interposed in said conduit means for controlling the pressure of fluid flowing through said conduit means, a manually operable lever for actuating said valve means to effect supply of fluid at a pressure corresponding to the degree of movement of said lever out of a normal release position into a brake application zone, a stop device associated with said valve means and adapted to be engaged by said manually operable lever upon movement of said lever to a service position at which supply of fluid at a certain degree of pressure is effected and to yieldingly resist further movement of said lever beyond said service position to thereby apprise the operator of the vehicle by sense of "feel" when said lever has been moved to said service position, a release valve device operable to one position for closing communication through said conduit means and relieving said brake application device of fluid pressure and operable to another position for opening said communication, a control device responsive to a slipping condition of said wheel and to termination of said slipping condition for effecting operation of said release valve device to its said one position and to its said other position, respectively, an alternate conduit means providing for flow of fluid under pressure from said source to said brake application device and by-passing said release valve device and said control device, and a by-pass device responsive to fluid at a pressure above said certain degree to close communication through said first conduit means and open communication through said alternate conduit means.

6. A brake control apparatus for a vehicle wheel comprising, in combination, a brake application device responsive to fluid pressure for effecting a brake application on said wheel and to relief of such pressure for effecting a brake release, a source of fluid under pressure for said brake application device, a first conduit means providing for flow of fluid under pressure from said source to said brake application device, manually operable valve means for controlling the pressure of fluid supplied from said source to said brake application device, a release valve device operable to one position for closing communication through said first conduit means and relieving said brake application device of fluid pressure and operable to another position for opening said communication, a control device responsive to a slipping condition of said wheel for operating said release valve device to its said one position and responsive to termination of said slipping condition to effect operation of said release valve device to its said other position, an alternate conduit means providing for flow of fluid under pressure from said source to said brake application device by by-passing said release valve device and said control device, and a by-pass device connected to said first and said alternate conduit means and comprising a casing and a piston slidably operable therein having one position for opening communication through said first conduit means and closing communication through said alternate conduit means and operable by fluid at a pressure above a certain degree to another position for closing communication through said first conduit means and opening communication through said alternate conduit means.

7. A brake control apparatus for a vehicle wheel comprising, in combination, a brake application device responsive to fluid pressure for effecting a brake application on said wheel and to relief of such pressure for effecting a brake release, a source of fluid under pressure for said brake application device, a first conduit means providing for flow of fluid under pressure from said source to said brake application device, manually operable valve means for controlling the pressure of fluid supplied from said source to said brake application device, a release valve device interposed in said first conduit means and operable to one position for closing communication therethrough and relieving said brake application device of fluid pressure and operable to another position for opening said communication, a control device responsive to a slipping condition of said wheel and to termination of said slipping for effecting operation of said release valve device to its said one and said other positions, respectively, an alternate conduit means providing for flow of fluid under pressure from said source to said brake application device by by-passing said release valve device and said control device, and a by-pass device comprising a casing with a piston slidably operable therein having at one side a first pressure chamber open to said manually operable valve means and at the opposite side a second pressure chamber open to said release valve device, a passageway in said piston adapted for opening said second chamber to said first chamber when said piston is in one position, a spring for biasing said piston to its said one position and yieldable to pressure of fluid above a certain degree in said first chamber for effecting operation of said piston to a by-pass position in which said second chamber is closed to said first chamber and said first chamber is open to said alternate conduit means.

8. In a brake control apparatus for a vehicle wheel, in combination, brake cylinder means operable by fluid under pressure to brake said wheel and in response to release of such fluid under pressure to free said wheel, an operator's control device having a certain zone of movement for supplying fluid at various pressures to said brake cylinder means and movable to a position out of said zone to supply fluid at a higher pressure, anti-wheel slide means controlled by said wheel and responsive to slipping of said wheel to release fluid under pressure from said brake cylinder means and to cessation of slipping of said wheel to provide for flow of fluid under pressure from said operator's control device to said brake cylinder means, and means responsive to said higher pressure of fluid to close communication between said brake cylinder means and anti-wheel slide means and open said brake cylinder means directly to said operator's control device for flow of fluid at said higher pressure directly to said brake cylinder means.

9. In a brake control apparatus for a vehicle wheel, in combination, brake cylinder means operable by fluid under pressure to brake said wheel and in response to release of such fluid under pressure to free said wheel, an operator's control device having a certain zone of movement for supplying fluid at various pressures to said brake cylinder means and movable to a position out of said zone to supply fluid at a higher pressure, resistance means arranged to oppose movement of said control device into said position, anti-wheel slide means controlled by said wheel and responsive to slipping of said wheel to release fluid under pressure from said brake cylinder means and to cessation of slipping of said wheel to provide for flow of fluid under pressure from said operator's control device to said brake cylinder means, and means responsive to said higher pressure of fluid to close communication between said brake cylinder means and anti-wheel slide means and upon said brake cylinder means directly to said operator's control device for flow of fluid at said higher pressure directly to said brake cylinder means.

References Cited in the file of this patent

UNITED STATES PATENTS

| 1,577,105 | Cattaneo | Mar. 16, 1926 |
| 2,030,955 | Aikman | Feb. 18, 1936 |